(12) United States Patent
De Benedittis et al.

(10) Patent No.: US 8,305,886 B2
(45) Date of Patent: Nov. 6, 2012

(54) CONTROLLING CONGESTION DETECTION IN HSDPA SYSTEMS

(75) Inventors: Rossella De Benedittis, Milan (IT); Gianluca Durastante, Poggio di Roio (IT); Gennaro Ciro Malafronte, Casola di Napoli (IT)

(73) Assignee: Nokia Siemens Networks S.p.A., Cassina De Pecchi (IT)

( * ) Notice: Subject to any disclaimer, the term of this patent is extended or adjusted under 35 U.S.C. 154(b) by 424 days.

(21) Appl. No.: 12/311,437

(22) PCT Filed: Sep. 13, 2007

(86) PCT No.: PCT/EP2007/007954
§ 371 (c)(1),
(2), (4) Date: Mar. 30, 2009

(87) PCT Pub. No.: WO2008/037357
PCT Pub. Date: Apr. 3, 2008

(65) Prior Publication Data
US 2010/0034087 A1   Feb. 11, 2010

(30) Foreign Application Priority Data
Sep. 28, 2006 (EP) .................................. 06425667

(51) Int. Cl.
*H04J 1/16* (2006.01)
(52) U.S. Cl. ....................................................... 370/229
(58) Field of Classification Search ........... 370/229–253
See application file for complete search history.

(56) References Cited

U.S. PATENT DOCUMENTS

| | | | | |
|---|---|---|---|---|
| 7,489,654 B2 * | 2/2009 | Bakker et al. | ................. | 370/328 |
| 7,751,328 B2 * | 7/2010 | Kloth | ............................. | 370/235 |
| 7,957,267 B2 * | 6/2011 | Sasagawa et al. | ............. | 370/216 |
| 2001/0016482 A1 * | 8/2001 | Bergstrom et al. | ........... | 455/332 |
| 2003/0156542 A1 * | 8/2003 | Connor | ......................... | 370/236 |
| 2004/0042465 A1 * | 3/2004 | Lee | ............................. | 370/395.52 |
| 2004/0240390 A1 * | 12/2004 | Seckin | ........................ | 370/252 |
| 2005/0022089 A1 * | 1/2005 | Le et al. | .......................... | 714/749 |
| 2006/0083243 A1 * | 4/2006 | Igarashi et al. | ............... | 370/392 |
| 2006/0126509 A1 * | 6/2006 | Abi-Nassif et al. | ........... | 370/235 |

(Continued)

FOREIGN PATENT DOCUMENTS
EP   1 018 846 A1   7/2000

(Continued)

OTHER PUBLICATIONS

3GPP, TS 25.435 V7.1.0 (Jun. 2006), 3rd Generation Partnership Project; Technical Specification Group Radio Access Network; UTRAN Iub Interface User Plane Protocols for Common Transport Channel data streams (Release 7).

(Continued)

*Primary Examiner* — Andrew Lai
*Assistant Examiner* — Juvena Loo
(74) *Attorney, Agent, or Firm* — Staas & Halsey LLP (57) ABSTRACT

A method controls transport network layer congestion detection in HSDPA systems. The method involves detecting, at an SRNC, a condition requiring the disabling, at a Node B, of measurements performed on certain fields of a data frame for detecting congestion for certain packet flows; sending, from the SRNC to the Node B, a command for disabling said measurements for the concerned packet flows; and resetting, at the Node B, any measurement performed until reception of said command for disabling the congestion detection.

32 Claims, 4 Drawing Sheets

U.S. PATENT DOCUMENTS

2006/0187821 A1* 8/2006 Watanabe et al. ............. 370/229
2006/0281413 A1* 12/2006 Burbidge et al. .......... 455/67.11
2009/0196189 A1* 8/2009 Ostrup et al. ................. 370/252

FOREIGN PATENT DOCUMENTS

WO  2005/104672 A2  11/2005
WO  2005/107293 A1  11/2005

OTHER PUBLICATIONS

3GPP, TS 25.433 V7.1.0 (Jun. 2006), 3rd Generation Partnership Project; Technical Specification Group Radio Access Network; UTRAN Iub interface Node B Application Part (NBAP) signalling (Release 7).

3GPP, TS 25.423 V6.1.0 (Jun. 2006), 3rd Generation Partnership Project; Technical Specification Group Access Network; UTRAN Iur interface Radio Network Subsystem Application Part (RNSAP) signalling (Release 6).

3GPP, TS 25.425 V6.3.0 (Sep. 2005), 3rd Generation Partnership Project; Technical Specification Group Radio Access Network; UTRAN Iur interface user plane protocols for Common Transport Channel data streams (Release 6).

3GPP, TS 25.402 V6.3.0 (Jun. 2005), 3rd Generation Partnership Project; Technical Specification Group Radio Access Network; Synchronisation in UTRAN Stage 2 (Release 6).

3GPP, TR 25.902 V1.0.0 (Jun. 2005), 3rd Generation Partnership Project; Technical Specification Group Radio Access Network; Iub/Iur Congestion Control; pp. 1-15.

* cited by examiner

CONTROLLING CONGESTION DETECTION IN HSDPA SYSTEMS

CROSS REFERENCE TO RELATED APPLICATIONS

This application is based on and hereby claims priority to PCT Application No. PCT/EP2007/007954 filed on Sep. 13, 2007 and European Application No. EP06425667 filed on Sep. 28, 2006, the contents of which are hereby incorporated by reference.

BACKGROUND

The dramatic increment of the demand by users of wireless communication systems for data services, like e-mail, file download, web browsing, multimedia streaming, etc., has made necessary an adequate response by the operators and industry. Known high-data rate packet transmission systems, like cdma2000, IMT-2000, 1XEV-DO, allow attaining downward data rates of up to 2.5 Mb/s.

A new system, named High-Speed Downlink Packet Access (HSDPA) for Wideband Code Division Multiple Access (WCDMA), has been developed by 3GPP (3rd Generation Partnership Project) to support data communications characterised by lower real-time demands than telephony services, higher data rates and asymmetric traffic, i.e. higher traffic volume in downlink direction than in uplink direction, as is for instance the case of file download and web browsing. The features of HSDPA have been defined in 3GPP Technical Specifications starting from Release 5. HSDPA has the following purposes and properties:

Data transmission in downlink direction only, i.e. from the Core Network (CN) via the Radio Network Control (RNC) to the subscriber;

Support of services from different Quality of Service (QoS) classes:
  Background, e.g. file download, E-mail delivery, SMS etc.: lowest priority, low timing constraints, but preservation of payload contents (low bit error rate);
  Interactive, e.g. web browsing, data base retrieval, server access, polling of measurement reports: higher traffic priority than background class traffic; end-to-end delay caused by HSDPA must be acceptable in a human- or machine-initiated request response pattern, i.e. it should not exceed a few seconds;
  Streaming, e.g. video/audio streaming: guaranteed, but with variable bit rate; the transmission delay must not exceed a certain time (~250 ms).

The technological enhancements incorporated by HSDPA not only provide a spectral efficiency gain, but also support user data rates up e.g. to 8-10 Mb/s, i.e. rates about 4-5 times higher than e.g. the IMT-2000 (International Mobile Telecommunications 2000) requirements.

An important issue with HSDPA traffic is the timely detection of transport network layer congestion at the Iub/Iur interface, i.e. the interface between the RNC and the Node B or between a Serving RNC (SRNC) and a Drift RNC (DRNC), respectively. The external HSDPA flow control between the Node B and the RNC adjusts the Iub/Iur traffic flow to the available throughput at the air interface individually for each HSDPA traffic flow. It may happen that the capacity allocation messages from Node B to RNC result in a total capacity greater than the available Iub/Iur transport capacity, which often is not dimensioned according to the maximum air interface throughput since it is a very expensive resource. Under congestion conditions, packets at the physical and data link layers (e.g. ATM/AAL2 packets) could become lost and the Radio Link Control (RLC) layer has to initiate re-transmissions that significantly degrade the average throughput per HSDPA user.

Before the 3GPP enhancements included in Release 6 specifications, congestion detection (CD) was only based on the supervision of the payload of High Speed-Downlink Shared Channel Frame Protocol (HS-DSCH FP) data frames received at the Node B. Indeed, packet loss can cause loss of a portion of a FP Protocol Data Unit (PDU) payload that very likely is detected by the payload and/or header Cyclical Redundancy Code (CRC). A congestion detection only based on the CRC(s) has a twofold drawback: on the one hand it does not allow detecting congestion situations in advance, as the CRC check can only reveal that some data have already been lost; on the other hand, it does not allow detecting the loss of complete FP frames.

According to Release 6 enhancements, those drawbacks are overcome through the use of two new fields or Information Elements (IEs) defined in the FP frames of a data flow, namely the Frame Sequence Number (FSN) and the Delay Reference Time (DRT). Reference can be made to International Patent Applications WO-A 05/107293 and WO-A 05/104672, as well as to 3GPP Technical Specifications (TS) 25.402 "Synchronisation in UTRAN Stage 2", 25.425 "UTRAN Iur interface user plane protocols for Common Transport Channel data streams", 25.435 "UTRAN Iub Interface User Plane Protocols for Common Transport Channel data streams", 3GPP Technical Report (TR) 25.902 "Iub/Iur congestion control". Information about the current versions of those documents and the publication dates thereof can be found at the 3GPP site ww.3GPP.org.

Substantially, FSN is a 4-bit field incremented by the SRNC at each transmitted HS-DSCH FP data frame belonging to a specific data flow. DRT is a 16-bit field that represents the count of a counter that is locked to the RNC Frame Number Counter (RFN) in the Serving RNC (SRNC), i.e. the RNC which actually controls the radio connection, and that counts from 0 to 40959 ms with a 1 ms resolution. The DRT values are a kind of time stamp of the transmission instants for a given HS-DSCH FP data frame.

Field FSN can be used by the Node B to estimate the packet loss rate, whereas field DRT can be used by Node B for dynamic delay measurements. Field DRT allows the Node B to detect in advance that congestion situations are about to occur, so that the Node B can timely request a reduction of the throughput on the Iub/Iur interface to the SRNC; on the other hand, if congestion occurs, the FSN field allows reducing to a minimum the impacts on the traffic, i.e. data losses.

Also a congestion management exploiting the FSN/DRT fields still gives rise to some problems.

In case of HSDPA, congestion management is an exclusive task of the Node B. There can be cases where the consistency of the received DRT and FSN values cannot be guaranteed at the Node B. An example is represented by Core Network procedures such as for instance SRNC relocation. Here the SRNC changes and the values of DRT and FSN transmitted to the Node B by the new SRNC are no longer consistent with those previously transmitted by the old SRNC, since the DRT and FSN values from different RNCs are generally locked to different RFNs, which inevitably exhibit a phase difference. Another possible inconsistency could result from a temporary impossibility for the SRNC to access the RFN. A discontinuity in the received DRT and FSN values would be attributed by the Node B to a congestion situation on the transport network and therefore it would trigger a reduction of the downlink Transmission Credits granted to the SRNC, which is in fact unmotivated. This will result in a decrease of the average throughput in the downlink direction and hence in a worsening of the QoS. In the worst case, all measurements performed by the Node B after the SRNC relocation could be affected.

More in general, it can be useful for the SRNC to have the possibility to temporarily suspend the DRT and FSN based TNL measurements at the Node B for some HSDPA flows for a defined time interval. This would additionally allow the SRNC to do a sort of temporary traffic priority handling, e.g. implicitly assigning higher priority (at TNL level) to those HSDPA data flows whose DRT and FSN based measurements have been suspended.

Currently there is no way for the transmitting side (i.e. the SRNC) to inform the receiving side (i.e. the Node B) of this situation. To avoid wrong measurements at the Node B, the SRNC could suspend the transmission of the DRT field for a given time interval, such that the Node B memory for the DRT measurements gets reset. However, such a procedure cannot be applied to the FSN field, as there is no possibility offered by the standard to suspend FSN transmission.

SUMMARY

One potential object is to control, from the SRNC, the processing of the FSN/DRT information elements at the Node B, so as to improve the reliability of the Downlink Transmission Credits calculation and to avoid the unnecessary and harmful reduction of HSDPA throughput caused by a wrong detection of TNL congestion situations, or, more generally, so as to provide an increased flexibility in congestion management for the individual data flows.

The inventors propose a method of controlling transport network layer congestion detection during transport of packet flows in a radio access network of a wireless communication system, wherein the congestion detection is carried out at a node receiving the packet flows and includes processes based on measurements performed on information elements included into the packet flows by a transmitting node. The method comprises:

detecting, at the transmitting node, a condition requiring disabling of the processes for certain packet flows;
sending, from the transmitting node to the receiving node, a command for disabling the processes for the concerned packet flows, individually for each flow; and
resetting, at the receiving node, upon reception of the disabling command, and the measurement performed so far.

The measurements can be restarted immediately after the reset or after a certain time, e.g. after a predefined time or upon reception of a specific restart command at the receiving node.

In an application in which the proposed method is used for differently managing packet flows with different priorities, the measurements for high priority flows could even be kept disabled for the whole period in which the flows are active.

In a preferred application, the method is performed in connection with HSDPA services, and the information elements are the FSN and DRT fields of the HS-DSCH data frames.

In the preferred embodiment of the proposed method, the disabling command is included into a spare field or field portion of the data frames, and most preferably value 0 of FSN is used for delivering such command.

The disabling/restart commands could however be transmitted as out-of-band (control plane) signaling messages, or be included into control frames of the user plane protocol.

The inventors also propose a radio access network for a wireless communication system where a transmitting node has a flow processor arranged to implement the above method, and a wireless communication system including such a radio access network.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
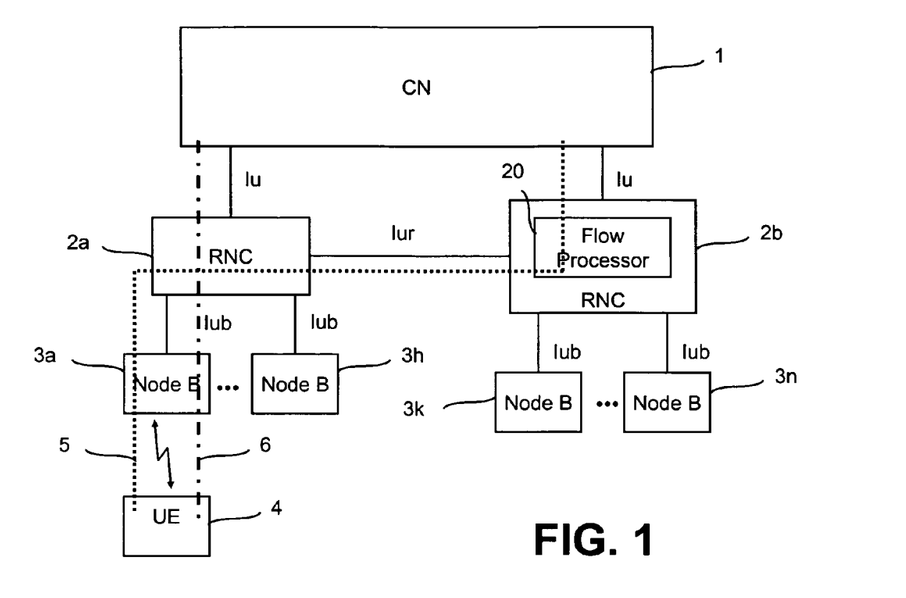
FIG. 1 is a schematic block diagram of a 3rd generation mobile communication system.

Referring to FIG. 1, there is schematically shown the architecture of a 3rd generation mobile communication system in which the proposed method can be employed. Core network 1 is connected to a plurality of Radio Network Controllers (RNC), two of which are shown at 2a and 2b. Each RNC controls a plurality of base stations (Nodes B) 3a . . . 3h and 3k . . . 3n to which users 4 (only one being shown in the drawing) have access. The RNCs 2a, 2b and the Nodes B 3a . . . 3n form the radio access network of the system. Dotted line 5 in the Figure indicates an HSDPA packet flow directed to user 4 through both a Serving RNC 2b and a Drift RNC 2a, e.g. during RNC relocation, when the user is passing from an area served by RNC 2b to an area served by RNC 2a through a soft handover procedure. Dashed-and-dotted line 6 indicates the flow when only a SRNC 2a is involved. For RNC 2b a flow processor 20 is also indicated, which organises the packet flow as requested by the HSDPA specifications and which is also entrusted with the control of the congestion detection function at the node B, as it will be disclosed below. References Iu, Iub, Iur denote the homonymous interfaces defined by 3GPP specifications.

Figure 3A:
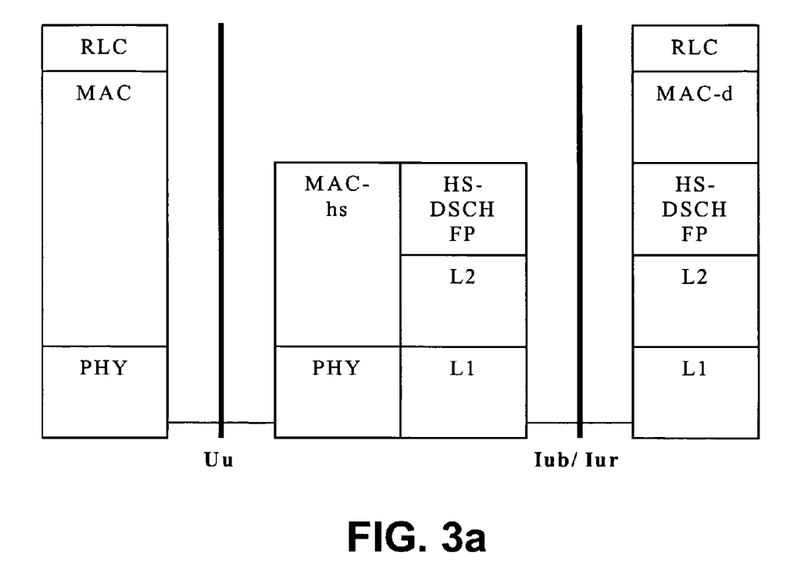
FIGS. 3a and 3b show the protocol stacks between an RNC and a Node B for HSDPA.
Figure 3B:
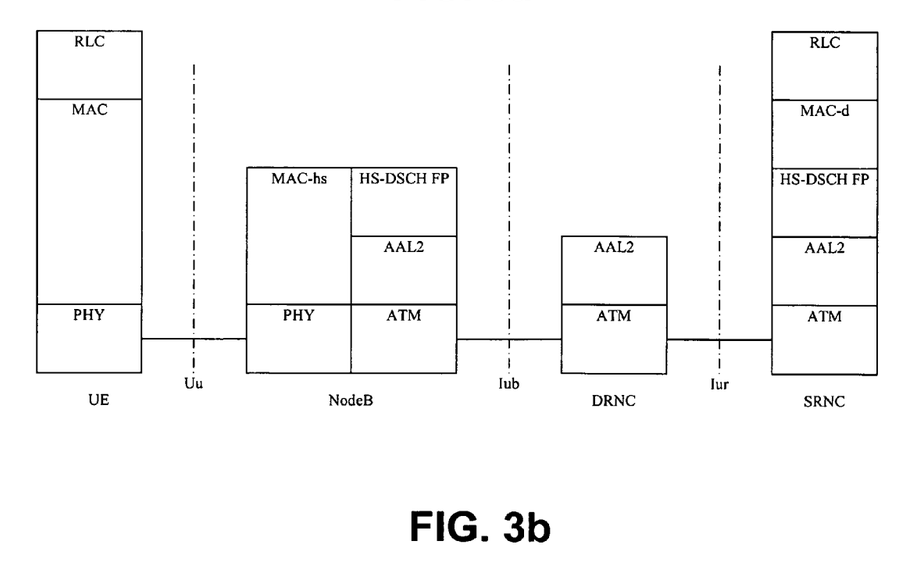
Figure 4:
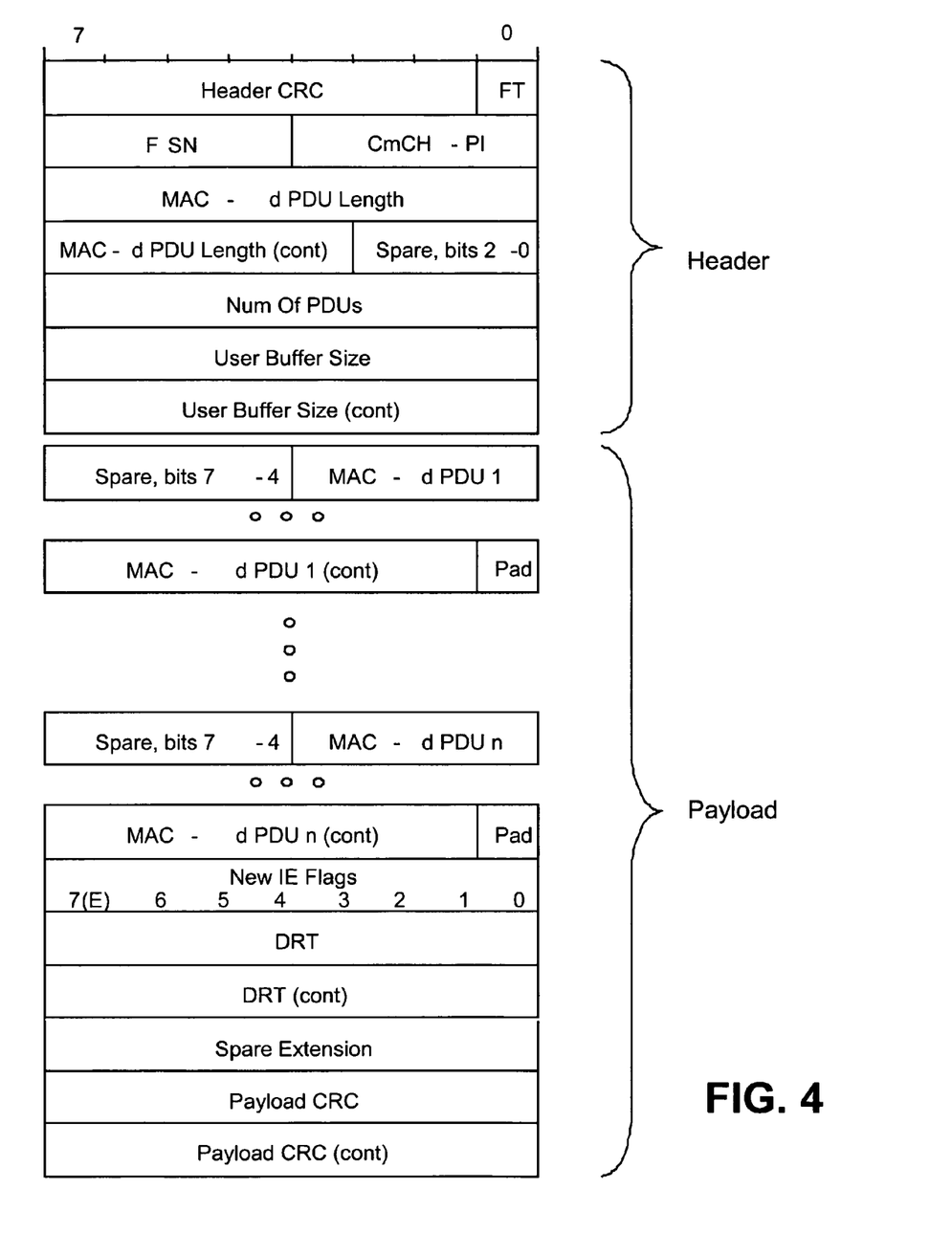
FIG. 4 shows the structure of an HS-DSCH FP data frame according to 3GPP Release 6 specifications.

For an easier understanding of the method, graphical representations of the protocol stacks for transmission of an HSDPA packet flow from an RNC to a user and of the structure of an HS-DSCH FP data frame according to Release 6 of the 3GPP specifications are enclosed as FIGS. 3a, 3b and 4, respectively. Both the protocol stacks and the frame structure are well known to the skilled in the art and no detailed description thereof is therefore necessary. Reference can be made for instance to the above-mentioned 3GPP TS 25.435.

In FIG. 3a, the physical and data link layers at the Iub/Iur interface are generally denoted L1, L2, whereas FIG. 3b explicitly refers to the use of ATM protocol at the physical layer and illustrates the stack also in correspondence of a DRNC. The proposed method operates at the level of the HS-DSCH FP protocol frames and therefore is independent of the transport protocol used at the physical layer (which could be also the Internet Protocol); moreover, in case of a situation in which a user is connected to both a SRNC and a DRNC, only the SRNC is concerned, since the DRNC is transparent to the HS-DSCH FP frames, as it is clearly apparent from FIG. 3b.

As to the HS-DSCH FP data frame structure, field FSN in the header and field DRT in the payload are of interest for understanding the method, as stated in the introduction of the specification. It is useful to remind that, in case of a congestion management exploiting fields FSN and DRT, the existence of valid DRT values is signalled by a flag in the "New IE Flags" field in the payload, which field just serves to indicate which information is valid in the fields that follow.

Figure 2:
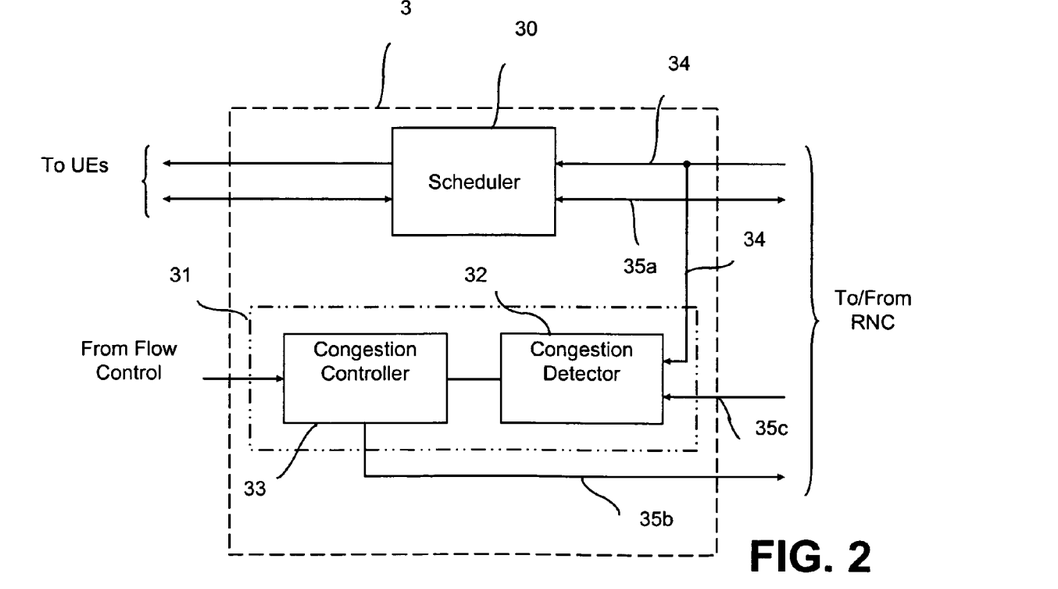
FIG. 2 is a simplified block diagram of a Node B of the system shown in FIG. 1.

FIG. 2 is a very simplified representation of the structure of a Node B 3 including a congestion management function controlled according to the proposed method.

Node B 3 has been represented as split into a scheduling portion 30 managing the transmission of the packet flows to the users (including packet buffering and allocation of downlink resources to the users) and a portion 31 entrusted with congestion management.

Scheduling portion 30 is not a concern here, and no further detail about its functions is necessary. On the RNC side of block 30, reference 34 schematises the user plane transport channel HS-DSCH, whereas reference 35a schematises the channels involved in the control plane signalling required by the operation of scheduling portion 30.

Congestion management portion 31 is in turn schematised by a congestion detector 32 and a congestion controller 33. Congestion detector 32 receives the above-mentioned fields of the HS-DSCH frames for the different data flows, performs certain measurements on the FSN and DRT fields on a per-flow basis and stores the results of such measurements, for instance in order to detect when the delay jitter or the number of frames lost within given observation windows exceed respective thresholds. Congestion detector 32 provides congestion indications or triggers to congestion controller 33, which dynamically evaluates the maximum data rate the Iub TNL is considered capable of handling and uses this value of capacity to properly filter the capacity allocations calculated by the external flow control (not shown) on the basis of the current congestion level on the air interface. The resulting capacity (transmission credits) is then granted to the SRNC via capacity allocation messages. Reference 35b denotes the control channel conveying such allocation messages to SRNC.

The congestion detection and congestion control mechanisms are highly relevant to this discussion. Methods exploiting the FSN and DRT fields are disclosed for instance in the patent documents mentioned above.

According to the proposal, the measurements carried out by congestion detector 34 on the FSN and DRT fields can be disabled upon command from the SRNC, when the SRNC processor 20 (FIG. 1) recognises a condition that makes such disabling necessary or suitable. An example of such condition could be the impossibility of guaranteeing the consistency of the DRT and FSN sequence at the Node B in certain time instants or during certain time intervals. Possible sources of such inconsistency can be an SRNC relocation or the impossibility to access the RFN counter (which is considered part of processor 20) calculating the values of the fields, or other events similarly undetectable by the Node B. Another case in which disabling of the FSN/DRT based measurements can be exploited could be the opportunity or the wish of managing in proprietary manner data flows with different priorities: for instance, the measurements could be disabled for higher priority flows and left operative for lower priority flows, whereby congestion situations are handled by limiting the throughput only for low priority flows.

Figure 5:
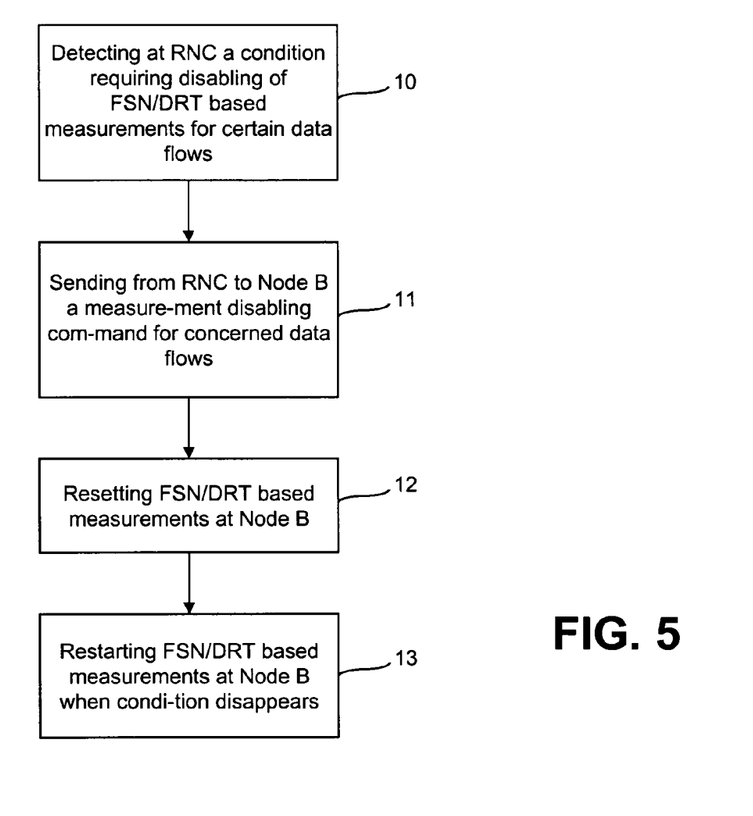
FIG. 5 is a flow chart of the proposed method.

Referring to the flow chart of FIG. 5, the recognition of the above condition for certain flows is indicated at step 10, and step 11 is the transmission from SRNC to the Node B of the disabling command. The effect of the command is resetting, at the Node B, the previous measurements on the FSN/DRT values in congestion detector 32, so that the command will be also referred to as "reset" command. In practice, the command causes the cancellation of the memory of such measurements for the concerned flow, and possibly the temporary suspension of the measurements. This is shown at step 12 in FIG. 5.

When the condition detected at step 10 is no longer present, the measurements at the Node B are restarted (step 13). Depending on the condition having originated the disabling, restart can take place immediately after the reset or after a certain time, e.g. upon a specific command by the RNC. In case of using the method to manage flows with different priorities, the RNC could even decide to keep the FSN/DRT based measurements disabled for the whole life of high priority flows.

In a first embodiment, the disabling or reset command (and the restart command, if it is provided separately) may be sent to congestion detector 32 in the form of out-of-band signalling messages via the Radio Network Layer Control Plane, by using the RNSAP/NBAP signalling protocols on the Iur/Iub interfaces. The control channels conveying RNSAP/NBAP signalling to congestion detector 32 have been indicated by reference 35c in FIG. 2. RNSAP/NBAP signalling protocols are well known to the skilled in the art and are defined in 3GPP specifications TS 25.423 "UTRAN Iur interface Radio Network Subsystem Application Part (RNSAP) signalling" and TS 25.433 "UTRAN Iub interface Node B Application Part (NBAP) signalling".

In a second embodiment, the command(s) may be transmitted by using HS-DSCH FP frames (in-band signalling). In-band solutions are preferred for the reasons that will become apparent below.

In more detail, in case of the embodiment based on out-of-band signalling, a first possibility is defining a new message "TNL RESET" in the RNSAP/NBAP protocols. When the Node B receives this message, it discards all previously collected FSN and DRT based measurements and immediately resumes new ones. Signalling the need to reset/restart the TNL congestion detection measurements via the Radio Network Layer Control Plane requires some synchronisation mechanism to have a proper time alignment between Control Plane (RNSAP/NBAP) and User Plane (HS-DSCH FP) protocols. The RNSAP/NBAP message that indicates the reset/restart should in fact be received at the node B exactly when the FSN and DRT based measurements have to be restarted. For instance, in the exemplary case of SRNC relocation, the reset indication should be received just before the first HS-DSCH FP frame containing valid FSN and DRT values is received from the new Serving RNC.

As stated above, a message including a mere "reset" command causes Node B to reset and immediately restart the FSN and DRT based measurements. If an immediate restart is not desired, the message should contain also a "time interval"

information: however, it might be difficult to foresee how long the condition having determined the need to disable congestion detection can last.

A more flexible solution, still based on out-of-band signalling, is defining a plurality of new messages in the RNSAP/NBAP protocols. For instance, six new messages could be defined: "TNL RESET", "TNL RESET CONFIRM", "TNL RESET FAILURE", "TNL RESUME", "TNL RESUME CONFIRM", "TNL RESUME FAILURE". When the Node B receives the TNL RESET message, it discards all previously collected FSN and DRT based measurements, but it does not start immediately new ones. This is done only when the "TNL RESUME" message is received. With this solution, the SRNC is able to independently control the suspension and the resumption of the Node B measurements. Moreover, the transmission of the CONFIRM/FAILURE messages by the Node B to the SRNC avoids possible deadlock situations following a "TNL RESET" or a "TNL RESUME" message loss. Clearly, the above-mentioned problem of the synchronisation between Control Plane and User Plane still exists. Moreover, the increased flexibility and reliability of such solution are paid with a greater signalling complexity.

Embodiments based on the use of HS-DSCH FP frames (in-band signalling) are preferable in that also the command(s) is (are) sent in the User Plane and hence the synchronisation problems between messages belonging to Control and User Planes are eliminated: the signalling is exactly received at the time instant when the action is required. A number of alternative solutions are possible also in this case.

According to a first solution, a new control frame "TNL RESET" is defined in the HS-DSCH FP protocol, such frame containing specific fields that allow the RNC to forward to the Node B e.g. the following commands: "RESET & RESTART": the Node B ignores all previously received FSN and DRT values (i.e. discards the previous measurements) and immediately restarts new measurements;
"RESET & WAIT": the Node B ignores all previously received FSN and DRT values and waits for additional RNC indications before restarting new measurements;
"RESUME": the Node B resumes FSN and DRT based measurements.

More than one control frame "TNL RESET" could be sent for redundancy reasons.

Figure 6:
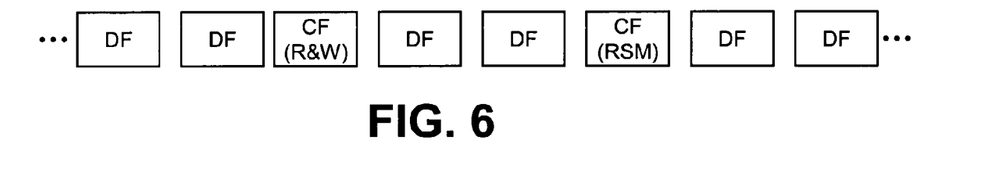
FIG. 6 is a graphical representation of an HS-DSCH FP frame sequence when using a first embodiment of the method based on in-band signaling.

According to this solution, the RNC will send a control frame "TNL RESET" in place of a data frame within the HS-DSCH FP stream to trigger any of the actions indicated above. This is depicted in FIG. 6, for the case in which RNC sends a "RESET & WAIT" (R&W) command followed by a "RESUME" (RSM) command. Blocks labelled DF are the data frames and blocks labelled CF are the control frames containing the above commands. As known, field FT (Frame Type) in the FP frame header (see FIG. 4) allows distinguishing data and control frames. For sake of simplicity, no redundancy has been shown in the drawing for frames CF. Here, the flow of HS-DSCH FP data frames shall be temporarily suspended in order to send the HS-DSCH FP control frame(s). However, only few TNL transmission intervals are lost from the data frame transfer point of view (the loss is generally of the order of some ms).

A more preferred embodiment exploits unused fields or field portions of the HS-DSCH data frame to command the Node B to reset the measurements in correspondence of a frame.

A first possibility is using bits of the "Spare Extension" field (see FIG. 4) in the data frame payload as the reset command. To this end, e.g. one bit in that field can be set to a predetermined value. If this solution is adopted, for data frames including a reset command a corresponding flag should be set in the "New IE Flags" field in order to signal to the Node B that the Spare Extension contains such new information element.

Another and most preferred possibility is based on the consideration that, at wraparound of the FSN count, value "0" is not used. According to 3GPP TS 25.435, value "0" is a special value used to indicate that the FSN IE shall be treated as spare. Such a value 0 is just used as the disabling command and it is to be inserted by SRNC processor 20 (FIG. 1) into the FSN field of the first frame after recognition of the event originating the need of disabling the congestion detection. SRNC processor 20 is required to insert value 0 also into the FSN field of the first frame after a call set up.

Figure 7:
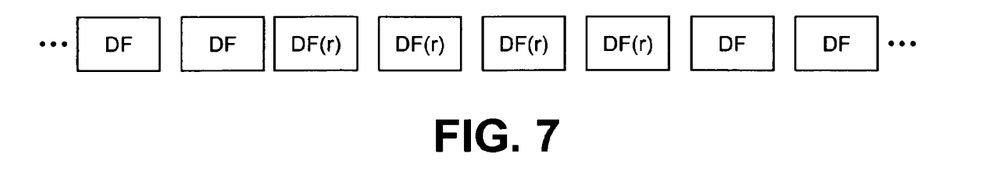
FIG. 7 is a graphical representation of an HS-DSCH FP frame sequence when using a second embodiment of the method based on in-band signaling.

FIG. 7 depicts the flow of HS-DSCH FP frames when the disabling command to congestion detector 32 (FIG. 2) is included in a data frame: here DF denotes "normal" data frames, containing valid values of FSN (different from 0) and DRT, whereas DF(r) denotes data frames containing the disabling command, e.g. a FSN field with value 0. The Figure clearly shows that, by using spare portions of the data frame to send the disabling command to the Node B, the SRNC has no need to suspend the data flow.

By inserting the command into a plurality of consecutive HS-DSCH data frames, as shown in FIG. 7, the SRNC has the possibility to freeze the FSN and DRT based measurements for a corresponding time interval, without need of sending an explicit restart command. Thus, the method is implemented in particularly simple manner.

The benefits coming from the adoption of the proposed technical solution can be resumed as follows:
the RNC has the possibility to command the Node B to ignore all currently available FSN and DRT based measurements and to restart new ones. This is favorable in cases when the RNC knows that the consistency of the FSN and DRT sequence cannot be temporarily guaranteed (e.g. in case of SRNC relocation) in some defined time instants.
the RNC has the additional possibility to temporarily suspend all FSN and DRT based measurements in the Node B for a defined time interval. This is favorable in cases when the RNC knows that the consistency of the DRT and FSN sequence cannot be temporarily guaranteed during a specified time interval.
the RNC has the additional possibility to implicitly give higher priority to some specific HSDPA flows (or to differently handle flows with different priorities) by disabling the FSN and DRT based measurements for such flows, while leaving them operating for the other flows: in case of congestion, this would result in a throughput reduction only for the "low priority" flows. Thus, a proprietary mechanism for handling priority is implemented.

It is evident that the above description has been given by way of non-limiting example and that changes and modifications are possible without departing from the scope of the method. In particular, even if the method has been discussed in detail with reference to HSDPA, it can be used in general in all situations where a receiving node manages congestion detection based on information included by a transmitting node into the packet flow and the transmitting node becomes aware of the need or the opportunity of disabling certain congestion detection processes at the receiving node.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir 2004).

The invention claimed is:

1. A method of controlling transport network layer congestion detection during transport of packet flows in a radio access network of a wireless communication system, the congestion detection being performed at a node receiving the packet flows and including execution of measurements on information elements inserted into the packet flows by a transmitting node, the method comprising:
   detecting a condition requiring disabling the execution of the measurements for specific packet flows at the transmitting node;
   sending a command to disable the execution of the measurements for the specific packet flows individually for each packet flow from the transmitting node to the receiving node; and
   resetting measurements performed for the packet flows upon reception of the command at the receiving node.

2. The method as claimed in claim 1, wherein the packet flows are packet flows relevant to High-Speed Downlink Packet Access service and the information elements are a Frame Sequence Number and a Delay Reference Time included by a Serving Radio Network Control into data frames of a High-Speed Downlink Shared Channel Frame Protocol.

3. The method as claimed in claim 1, further comprising restarting the measurements at the receiving node immediately after the resetting of the performed measurements.

4. The method as claimed in claim 1, further comprising restarting the measurements at the receiving node after a predetermined time has elapsed or upon reception of an explicit restart command.

5. The method as claimed in claim 1, wherein the condition requiring disabling the execution of the measurements for the specific packet flows is based on an impossibility of guaranteeing a consistency of a sequence of the information elements at certain time instants or during certain time intervals for the specific packet flows at the receiving node.

6. The method as claimed in claim 1, wherein the condition requiring disabling the execution of the measurements for the specific packet flows is based on a priority of the packet flows.

7. The method as claimed in claim 6, wherein the disabling concerns high priority packet flows.

8. The method as claimed in claim 7, wherein the disabling occurs for a period in which a specific high priority packet flow is active.

9. The method as claimed in claim 3, wherein the command is inserted into control plane signaling messages.

10. The method as claimed in claim 9, wherein a single control plane signaling message is sent to the receiving node to cause the resetting and the restarting of the measurements.

11. The method as claimed in claim 4, wherein the command is inserted into control plane signaling messages.

12. The method as claimed in claim 5, wherein a single control plane signaling message is sent to the receiving node to cause the resetting and the restarting of the measurements.

13. The method as claimed in claim 11, wherein separate control plane signaling messages are sent to the receiving node to cause the resetting and the restarting of the measurements.

14. The method as claimed in claim 13, further comprising sending a reset confirmation/failure message or a restart confirmation/failure message from the receiving node to the transmitting node upon reception at the receiving node of the reset confirmation/failure message or the restart confirmation/failure message and successful/unsuccessful execution of the command.

15. The method as claimed in claim 1, wherein the command is inserted into at least one control frame of a user plane protocol, the at least one control frame being transmitted to the receiving node in place of a data frame.

16. The method as claimed in claim 15, wherein the at least one control frame contain fields to send commands to the receiving node to cause the receiving node to restart the measurements immediately after reset, to keep execution of the measurements disabled until reception of a further command from the transmitting node and to restart the measurements after a temporary disabling.

17. The method as claimed in claim 15, wherein the transmission of the control frame to the receiving node is repeated.

18. The method as claimed in claim 1, wherein the disabling command is inserted into a spare field or a field portion of a data frame.

19. The method as claimed in claim 18, wherein the disabling command is transmitted by using a spare value of one of the information elements used for the measurements.

20. The method as claimed in claim 2, wherein value 0 of the Frame Sequence Number information element is used to deliver the disabling command to the receiving node.

21. The method as claimed in claim 1, wherein the disabling command is kept present in data frames as long as the condition requiring the disabling of the execution of the measurements exists.

22. A radio access network of a wireless communication system transporting packet flows directed to and coming from user equipment, comprising:
   a transmitting node transmitting the packet flows, the transmitting node including a flow processor inserting information elements into the packet flows; and
   a receiving node including a congestion detector detecting transport network layer congestion conditions at an interface between the transmitting node and the receiving node based on a result of measurements performed on the information elements,
   wherein the flow processor detects a condition requiring disabling of execution of the measurements for specific packet flows and sends a command to disable the execution of the measurements for the specific packet flows to the congestion detector individually for each of the packet flows, and to cause a reset of the measurements performed by the congestion detector upon reception of the command.

23. The radio access network as claimed in claim 22, wherein the flow processor sends a disabling command causing a restart of the measurements immediately after the reset or after a specified time to the congestion detector.

24. The radio access network as claimed in claim 22, wherein the flow processor sends an explicit restart command to restart the measurements to the congestion detector.

25. The radio access network as claimed in claim 22, wherein the flow processor sends a disabling command to the congestion detector to maintain the execution of the measurements disabled for an entire period in which a specific packet flow is active.

26. The radio access network as claimed in claim 22, wherein the flow processor inserts the command into signaling messages of a control plane radio network layer transport protocol.

27. The radio access network as claimed in claim 22, wherein the flow processor inserts the command into control frames of a user plane radio network layer transport protocol.

28. The radio access network as claimed in claim 22, wherein the flow processor inserts the disabling command into data frames of a user plane radio network layer transport protocol and keeps the disabling command present in the data frames until the condition requiring disabling of the execution of the measurements exists.

29. The radio access network as claimed in claim 28, wherein the packet flows are packet flows relevant to a High-Speed Downlink Packet Access service, and the information elements are a Frame Sequence Number and a Delay Reference Time included by a Serving Radio Network Control into data frames of a High-Speed Downlink Shared Channel Frame Protocol.

30. The radio access network as claimed in claim 29, wherein the flow processor sets a value of the Frame Sequence Number field to 0 in the data frames in which the disabling command is to be included.

31. A wireless communication system, comprising:
at least one user equipment; and
a radio access network transporting packet flows directed to and coming from the user equipment, the radio access network including:
   a transmitting node transmitting the packet flows, the transmitting node including a flow processor inserting information elements into the packet flows; and
   a receiving node including a congestion detector detecting transport network layer congestion conditions at an interface between the transmitting node and the receiving node based on a result of measurements performed on the information elements,
wherein the flow processor detects a condition requiring disabling of execution of the measurements for specific packet flows and sends a command to disable the execution of the measurements for the specific packet flows to the congestion detector individually for each of the packet flows, and to cause a reset of the measurements performed by the congestion detector upon reception of the command.

32. A wireless communication system transporting packet flows directed to and coming from user equipment, comprising:
a processor configured to insert information elements into the packet flows; and
a congestion detector configured to perform measurements on the information elements, wherein
the processor detects a condition requiring disabling of execution of the measurements for specific packet flows, sends a command to disable the execution of the measurements for the specific packet flows to the congestion detector individually for each of the packet flows, and causes a reset of the measurements performed by the congestion detector upon reception of the command.

* * * * *